(12) United States Patent
Moon et al.

(10) Patent No.: US 9,774,015 B2
(45) Date of Patent: Sep. 26, 2017

(54) BATTERY MODULE HAVING STRUCTURE FOR PREVENTING MIXING OF COOLANT AND VENT GAS

(71) Applicant: LG CHEM, LTD., Seoul (KR)

(72) Inventors: Jung Oh Moon, Daejeon (KR); Dal Mo Kang, Daejeon (KR); Jong Woon Choi, Daejeon (KR); Jun Yeob Seong, Daejeon (KR); Byung O Kong, Daejeon (KR); Youngsop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/913,008

(22) PCT Filed: Aug. 27, 2014

(86) PCT No.: PCT/KR2014/007800
§ 371 (c)(1),
(2) Date: Feb. 19, 2016

(87) PCT Pub. No.: WO2015/030431
PCT Pub. Date: Mar. 5, 2015

(65) Prior Publication Data
US 2016/0204398 A1 Jul. 14, 2016

(30) Foreign Application Priority Data
Aug. 28, 2013 (KR) .......... 10-2013-0102623

(51) Int. Cl.
*H01M 10/052* (2010.01)
*H01M 2/08* (2006.01)
(Continued)

(52) U.S. Cl.
CPC .......... *H01M 2/08* (2013.01); *H01M 2/0245* (2013.01); *H01M 2/0262* (2013.01);
(Continued)

(58) Field of Classification Search
CPC .......... H01M 10/613; H01M 10/647
See application file for complete search history.

(56) References Cited

U.S. PATENT DOCUMENTS

2006/0216582 A1* 9/2006 Lee .............. H01M 2/1077
429/120
2009/0186265 A1 7/2009 Koetting et al.
(Continued)

FOREIGN PATENT DOCUMENTS

CN 101919106 A 12/2010
CN 102356506 A 2/2012
(Continued)

OTHER PUBLICATIONS

International Search Report, issued in PCT/KR2014/007800, dated Dec. 2, 2014.

*Primary Examiner* — Olatunji Godo
(74) *Attorney, Agent, or Firm* — Birch, Stewart, Kolasch & Birch, LLP (57) ABSTRACT

Disclosed herein is a battery module including two or more battery cells, which can be charged and discharged, arranged in a stacked state and cartridges for fixing the battery cells to constitute a battery cell stack, wherein each of the cartridges includes a cooling fin contacting the battery cells and a cartridge frame for fixing the cooling fin, the cooling fin includes two cooling plates, the cooling plates being mounted to the cartridge frame in a state of being spaced apart from each other in order to define a coolant flow channel, the cartridge frame is provided with openings communicating with the coolant flow channel defined between the cooling plates, and one side or opposite sides of each of the battery cells are sealed by a sealing member on an interface between each of the battery cells and the coolant flow channel in order to prevent gases generated in the
(Continued)

battery cells from being introduced into the coolant flow channel.

23 Claims, 4 Drawing Sheets

(51) Int. Cl.
| | |
|---|---|
| H01M 10/613 | (2014.01) |
| H01M 10/6551 | (2014.01) |
| H01M 10/6556 | (2014.01) |
| H01M 2/02 | (2006.01) |
| H01M 2/10 | (2006.01) |
| H01M 10/625 | (2014.01) |
| H01M 10/647 | (2014.01) |
| H01M 10/6554 | (2014.01) |

(52) U.S. Cl.
CPC ....... *H01M 2/0267* (2013.01); *H01M 2/0277* (2013.01); *H01M 2/0287* (2013.01); *H01M 2/1077* (2013.01); *H01M 10/613* (2015.04); *H01M 10/625* (2015.04); *H01M 10/647* (2015.04); *H01M 10/6551* (2015.04); *H01M 10/6554* (2015.04); *H01M 10/6556* (2015.04); *H01M 2220/20* (2013.01)

(56) References Cited

U.S. PATENT DOCUMENTS

| | | | |
|---|---|---|---|
| 2009/0220853 A1* | 9/2009 | Yang | H01M 2/0277 429/159 |
| 2011/0293982 A1* | 12/2011 | Martz | H01M 10/613 429/120 |
| 2011/0318623 A1 | 12/2011 | Lee et al. | |
| 2012/0034507 A1 | 2/2012 | Harada et al. | |
| 2012/0156538 A1 | 6/2012 | Meintschel et al. | |
| 2013/0045410 A1* | 2/2013 | Yang | H01M 10/625 429/120 |
| 2013/0202939 A1 | 8/2013 | Kwak et al. | |

FOREIGN PATENT DOCUMENTS

| | | |
|---|---|---|
| KR | 10-2009-0002428 A | 1/2009 |
| KR | 10-2009-0079802 A | 7/2009 |
| KR | 10-2010-0047907 A | 5/2010 |
| KR | 10-2012-0074425 A | 7/2012 |
| KR | 10-2012-0093757 A | 8/2012 |
| KR | 10-2013-0081027 A | 7/2013 |
| KR | 10-2013-0091510 A | 8/2013 |
| WO | WO 2011145830 | * 11/2011 |

* cited by examiner

BATTERY MODULE HAVING STRUCTURE FOR PREVENTING MIXING OF COOLANT AND VENT GAS

TECHNICAL FIELD

The present invention relates to a battery module having a structure for preventing mixing a coolant and a vent gas, and more particularly to a battery module including two or more battery cells, which can be charged and discharged, arranged in a stacked state and cartridges for fixing the battery cells to constitute a battery cell stack, wherein each of the cartridges includes a cooling fin contacting the battery cells and a cartridge frame for fixing the cooling fin, the cooling fin includes two cooling plates, the cooling plates being mounted to the cartridge frame in a state of being spaced apart from each other in order to define a coolant flow channel, the cartridge frame is provided with openings communicating with the coolant flow channel defined between the cooling plates, and one side or opposite sides of each of the battery cells are sealed by a sealing member on an interface between each of the battery cells and the coolant flow channel in order to prevent gases generated in the battery cells from being introduced into the coolant flow channel.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell (a unit cell) of the battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting such a battery module are secondary batteries which can be charged and discharged. Consequently, a large amount of heat is generated from the high-output, large-capacity secondary batteries during the charge and discharge of the secondary batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a high-output, large-capacity battery module needs a cooling system for cooling battery cells mounted in the battery module.

The cooling system is generally configured to forcibly circulate a coolant in a battery module in order to remove heat from battery cells constituting the battery module. That is, the cooling system is configured to cool battery cells or unit modules constituting the battery module through contact between a coolant and the surfaces of the battery cells or the unit modules. Gas, such as air, is used as the coolant. Consequently, the cooling system may be a contact-based air cooling type cooling system.

However, it is necessary for the cooling system of the battery module to be configured such that the coolant uniformly reaches to the respective battery cells constituting the battery module. In a case in which the battery module is manufactured using a plurality of members capable of improving cooling efficiency, therefore, the size of the battery module as well as manufacturing cost of the battery module is increased. In addition, it is difficult to install a battery system, such as a battery module, having a large size in a limited space, such as an electric vehicle (EV) or a hybrid electric vehicle (HEV). For this reason, there is a high necessity for a cooling system that is capable of exhibiting high cooling efficiency while being configured to have a compact structure.

In addition, a short circuit occurs in a battery cell due to exposure of the battery cell to a high-temperature environment or malfunction of the battery cell, an electrolyte is decomposed on a positive electrode interface of the battery cell with the result that a large amount of gas is generated, whereby the internal pressure of the battery cell is increased. According to circumstances, a battery case may be ruptured, and the gas may be discharged out of the battery cell. In general, the internal gas of the battery cell contains a toxic component, such as carbon monoxide, which is harmful to humans. In a case in which the gas discharged from the battery cell and the coolant flowing in the battery module is mixed with each other, cooling efficiency is reduced, and at the same time, the safety of the battery module is reduced. For example, in a case in which the battery module is mounted in a vehicle, the gas generated in the battery cell may be introduced into driver and passenger spaces of the vehicle during the circulation of the coolant with the result that humans suffer harmful health effects.

Consequently, there is a high necessity for a battery module configured to have a structure that is capable of preventing mixing of gas generated in a unit cell and coolant flowing along a coolant flow channel while having a compact structure and exhibiting excellent cooling efficiency.

DISCLOSURE

Technical Problem

Therefore, the present invention has been made to solve the above problems, and other technical problems that have yet to be resolved.

Specifically, it is an object of the present invention to provide a battery module configured to have a structure that is capable of preventing mixing of gas generated in the battery module and a coolant flowing along a coolant flow channel, whereby the lifespan of the battery module is lengthened, and the safety of the battery module is improved.

Technical Solution

In accordance with one aspect of the present invention, the above and other objects can be accomplished by the provision of a battery module including two or more battery cells, which can be charged and discharged, arranged in a stacked state and cartridges for fixing the battery cells to constitute a battery cell stack, wherein each of the cartridges includes a cooling fin contacting the battery cells and a cartridge frame for fixing the cooling fin, the cooling fin includes two cooling plates, the cooling plates being mounted to the cartridge frame in a state of being spaced apart from each other in order to define a coolant flow channel, the cartridge frame is provided with openings communicating with the coolant flow channel defined between the cooling plates, and one side or opposite sides of each of the battery cells are sealed by a sealing member on an interface between each of the battery cells and the coolant flow channel in order to prevent gases generated in the battery cells from being introduced into the coolant flow channel.

Sides of a battery cell means some of the edge of the battery cell excluding some of the edge of the battery cell from which electrode terminals protrude. When the battery cells are fixed between the cartridge frames, therefore, there is no possibility of gas being discharged through the sides of each of the battery cells adjacent to the openings since one side or opposite sides of each of the battery cells are sealed by the sealing member. Consequently, it is possible to effectively prevent the gas from being introduced into the coolant flow channel. In addition, the gas is discharged in a direction different from a direction in which the coolant flows. Consequently, it is possible to prevent mixing of the coolant and the gas in the battery module, thereby lengthening the lifespan of the battery module and securing the safety of the battery module.

In a concrete example, the sealing member may seal the opposite sides of each of the battery cells excluding regions of each of the battery cells from which electrode terminals protrude such that the gases generated in the battery cells are discharged in directions in which the electrode terminals are located.

Specifically, the sealing member may seal the opposite sides of each of the battery cells in a state of completely surrounding the opposite sides of each of the battery cells. Alternatively, the sealing member may seal the opposite sides of each of the battery cells in a state of partially surrounding the opposite sides of each of the battery cells.

The sealing member may be made of a thermoplastic resin for improving sealability. The thermoplastic resin is not particularly restricted so long as the thermoplastic resin is capable of effectively maintaining sealability. Specifically, the thermoplastic resin may be a hot-melt resin, which is applied to an object in a liquid state at a high temperature without using water or a solvent and is then solidified in a few second to exhibit high adhesive strength and hardness.

The hot-melt resin exhibits high water resistance. In a case in which the hot-melt resin is used for a battery cell which is easily damaged due to moisture, the hot-melt resin exhibits effective watertightness. Consequently, the hot-melt resin is very desirable in terms of the safety of the battery cell.

Meanwhile, the hot-melt resin is hardened without performing a drying process. Sealing of the battery cell may be achieved by a potting process, which enables automation of a production line and improvement of productivity.

The potting process has advantages in that process speed is increased, personnel expenses are reduced, and the amount of a raw material is reduced through easily control of the amount of the raw material that is applied.

For reference, in the present invention, THERMELT 861 produced by BOSTICK is used as the hot-melt resin. However, the present invention is not limited thereto. Other commercialized hot-melt resins may be used.

In a concrete example, the cartridge frame constituting the cartridge may be provided in the inside thereof with two or more ribs for supporting the battery cells while defining the coolant flow channel. For example, the ribs may be arranged in parallel to each other in a direction in which the coolant flow channel is defined.

In addition, the width of each of the openings formed in the cartridge frame may correspond to the distance between the ribs. In a concrete example, the cartridge frame may be provided with openings, which has a size corresponding to the distance between the ribs. The openings may function as coolant inlet ports and coolant outlet ports of the coolant flow channels. Consequently, openings, through which the coolant is introduced, may be formed in one side of the cartridge frame, and openings, through which the coolant is discharged, may be formed in the other side of the cartridge frame.

The cooling plates may be configured such that the surfaces of the cooling plates contacting the battery cells are formed in a flat shape for effective heat conduction.

In a concrete example, the cooling plates may be configured such that opposite ends of the cooling plates corresponding to one side of the cartridge frame in which the openings are formed and the other side of the cartridge frame in which the openings are formed are integrally mounted to the cartridge frame.

The cooling plates may be integrally mounted to the cartridge frame. For example, the cooling plates may be mounted to the cartridge frame using various methods, such as assembly, attachment, or insert injection molding. However, the present invention is not limited thereto.

In a concrete example, the battery cell stack may be configured to have a structure in which two battery cells are mounted between one cartridge and an adjacent cartridge. That is, the battery cell stack may be configured to have a structure in which a cartridge, a battery cell, another battery cell, and another cartridge are sequentially arranged, and this arrangement is repeated. As a result, the top surface of one of the two neighboring battery cells may contact the upper cartridge, and the bottom surface of the other battery cell may contact the lower cartridge.

The kind and structure of each of the battery cells are not particularly restricted. For example, each of the battery cells may be a lithium secondary battery. In addition, each of the battery cells may be a rectangular plate-shaped battery cell having a large length to width ratio.

The plate-shaped battery cell may be a pouch-shaped battery cell configured to have a structure in which an electrode assembly is mounted in a cell case made of a laminate sheet including a resin layer and a metal layer, the edge of the cell case is sealed.

Specifically, the plate-shaped battery cell may be a pouch-shaped battery cell configured to have a structure in which an electrode assembly of a positive electrode/separator/ negative electrode structure is contained in a battery case together with an electrolyte in a sealed state. The battery cell may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. In an example of the structure, the battery case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding.

In another example of the structure, the battery case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are bonded with a hot-melt resin. Thermal bonding may be further performed after bonding with the hot-melt resin. In this case, it is possible to manufacture the battery cell such that the battery cell exhibits higher sealability. In addition, moisture is prevented from being introduced into the battery cell due to high water resistance of the hot-melt resin, thereby improving the safety of the battery cell.

Each of the battery cells may be configured to have a structure in which a positive electrode terminal and a negative electrode terminal protrude from one side of an edge of each of the battery cells or a structure in which the positive electrode terminal protrudes from one side of the edge of each of the battery cells and the negative electrode terminal protrudes from the other side of the edge of each of the battery cells.

Meanwhile, the battery module according to the present invention may further include an upper end plate and a lower end plate for respectively supporting the upper end and the lower end of the battery cell stack in which the battery cells are stacked in a vertical direction in a state of being fixed by the cartridges, and a front plate and a rear plate mounted to the battery cell stack such that the front plate and the rear plate respectively surround one side and the opposite side of each of the battery cells from which electrode terminals of each of the battery cells protrude.

According to circumstances, at least one of the upper and lower end plates may be provided with two or more beads for improving rigidity thereof. For example, each of the beads may be formed in a shape having a large length to width ratio. The beads may be arranged in parallel to each other in a state of protruding from the upper end plate or the lower end plate or being concaved in the upper end plate or the lower end plate.

In addition, at least one of the upper and lower end plates may be provided at opposite ends of the edge thereof with extensions, which are perpendicularly bent to cover corner parts of one side and the opposite side of each of the battery cells from which the electrode terminals of each of the battery cells protrude. The perpendicularly bent extensions may be coupled and fixed to the front plate or the rear plate.

In accordance with another aspect of the present invention, there is provided a battery pack including the battery module as a unit module.

The battery pack may be manufactured by combining battery modules as unit modules of the battery pack based on desired output and capacity. The battery pack according to the present invention may be used as a power source for electric vehicles, hybrid electric vehicles, plug-in hybrid electric vehicles, or power storage apparatuses in consideration of installation efficiency and structural stability. However, the present invention is not limited thereto.

In accordance with a further aspect of the present invention, there is provided a device including the battery pack as a power source. Specifically, the device may be used as an electric vehicle, a hybrid electric vehicle, a plug-in hybrid electric vehicle, or a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
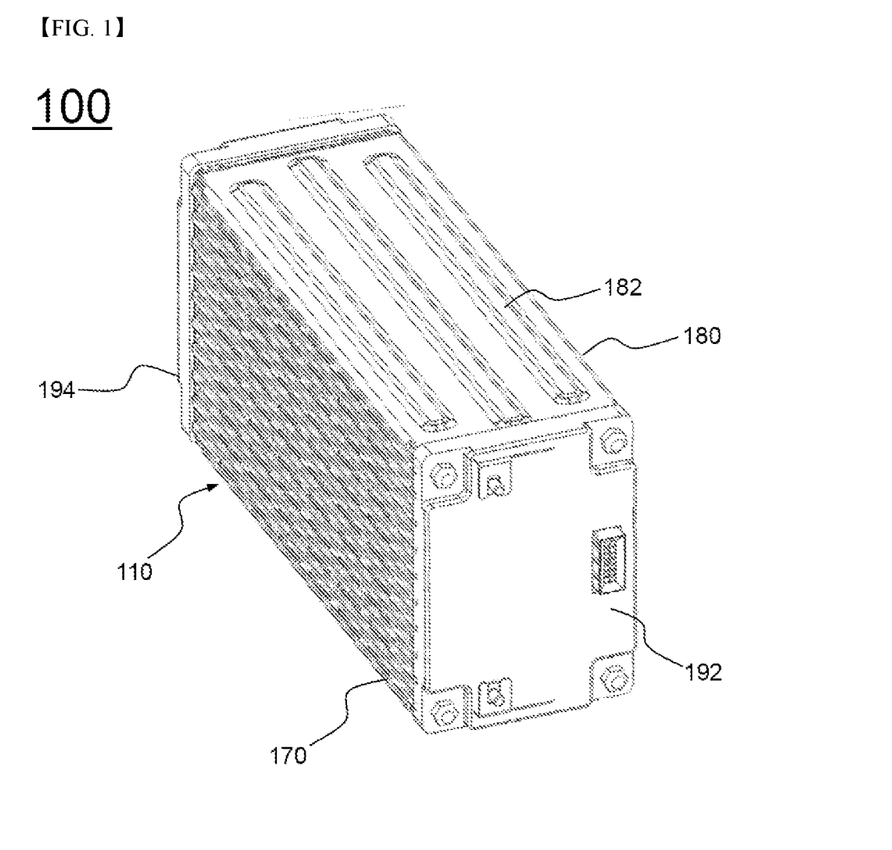
FIG. 1 is a perspective view showing a battery module according to an embodiment of the present invention.
Figure 2:
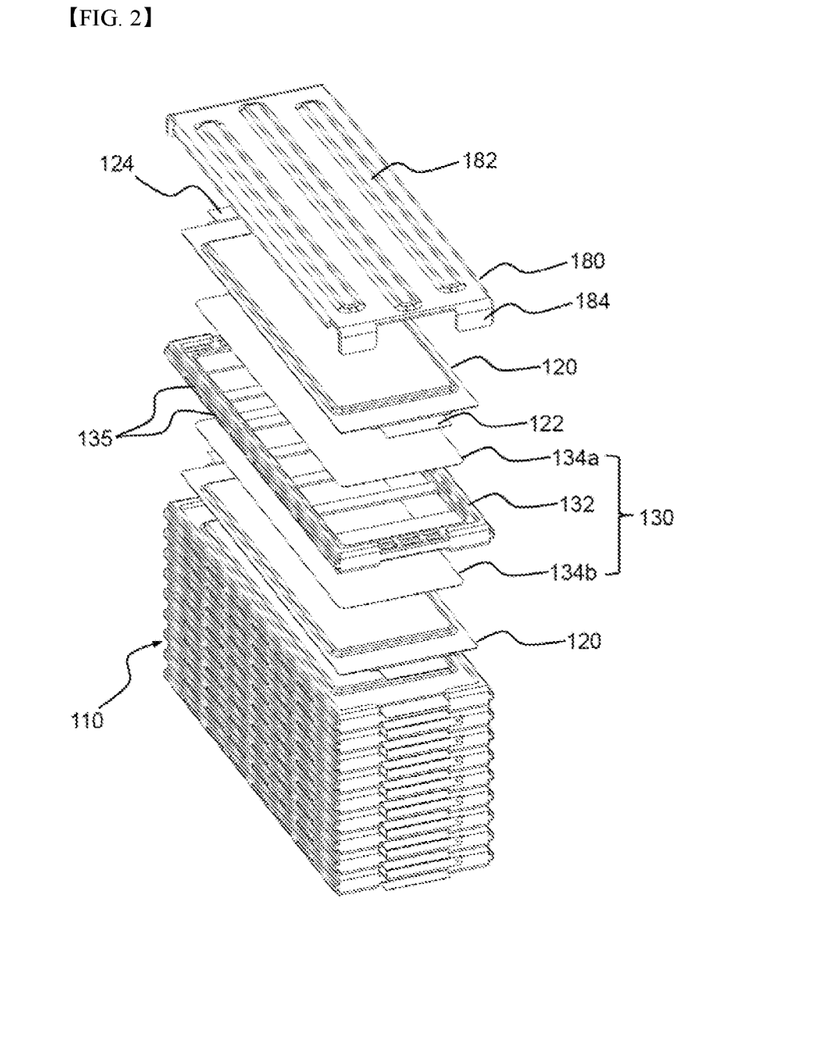
FIG. 2 is a perspective view showing the battery module of FIG. 1 in a state in which the upper part of the battery module is disassembled.

FIG. 1 is a perspective view showing a battery module according to an embodiment of the present invention, and FIG. 2 is a perspective view showing the battery module of FIG. 1 in a state in which the upper part of the battery module is disassembled.

Referring to FIGS. 1 and 2, a battery module 100 is configured to have a structure including a battery cell stack 110, a lower end plate 170, an upper end plate 180, a front plate 192, and a rear plate 194.

The lower end plate 170 supports the lower end of the battery cell stack 110, and the upper end plate 180 fixes the uppermost part of the battery cell stack 110 located on the lower end plate 170. That is, the upper end plate 180 and the lower end plate 170, which are located at the upper end and the lower end of the battery cell stack 110, respectively, press the upper end and the lower end of the battery cell stack 110, respectively, to fix the battery cell stack 110.

The upper end plate 180 and the lower end plate 170 are each provided with a plurality of beads 192 for improving rigidity of the upper end plate 180 and the lower end plate 170 and for further pressing the battery cell stack 110 such that battery cells constituting the battery cell stack 110 can closely contact each other.

The battery cell stack 110 is configured to have a structure in which battery cells 120 and cartridges 130 are alternately stacked. Each of the cartridges 130 includes two cooling plates 134a and 134b interposed between corresponding ones of the battery cells 120 and a cartridge frame 132 for fixing the cooling plates 134a and 134b. The battery cells 120 are fixed to constitute the battery cell stack 110.

Each of the battery cells 120 may be a plate-shaped battery cell 120, more specifically a pouch-shaped battery cell 120, configured to have a structure in which a positive electrode terminal 122 protrudes from one side of the edge thereof, and a negative electrode terminal 124 protrudes from the other side of the edge thereof. The battery cells 120 are fixed between neighboring ones of the cartridges 130.

Each of the cartridges 130 includes a cooling fin constituted by two cooling plates 134a and 134b interposed between corresponding ones of the battery cells 120 and a cartridge frame 132 for fixing the cooling fin. Coolant flow channels are defined in each of the cartridges 130. In addition, each of the cartridges 130 is provided, at opposite sides thereof adjacent to the sides of the edge of each of the battery cells 120 from which the positive electrode terminal 122 and the negative electrode terminal 124 protrude, with openings 135 communicating with the coolant flow channels.

In addition, the upper end plate 180 and the lower end plate 170 are each provided at opposite ends of the edge thereof with extensions 184, which are perpendicularly bent to cover corner parts of one side and the other side of each of corresponding ones of the battery cells 120 from which the electrode terminals 122 and 123 protrude. The perpendicularly bent extensions 184 are coupled and fixed to the front plate 192 and the rear plate 194.

Figure 3:
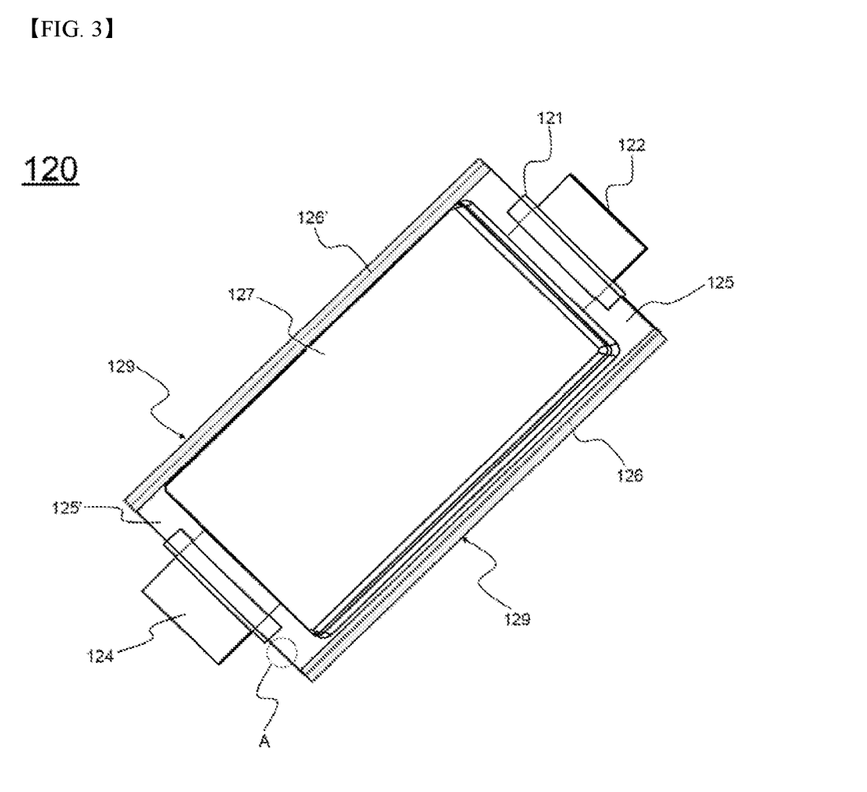
FIG. 3 is a perspective view showing a battery cell sealed with a hot-melt resin.

FIG. 3 is a perspective view showing a battery cell sealed with a hot-melt resin.

Referring to FIG. 3, the battery cell 120 has an electrode assembly (not shown) mounted in a cell case 127 made of a laminate sheet. The battery cell 120 is configured to have a structure in which a positive electrode terminal 122 protrudes from the upper end 125 of the edge of the cell case 127, a negative electrode terminal 124 protrudes from the lower end 125' of the edge of the cell case 127, which is opposite to the upper end 125 of the edge of the cell case 127, and the upper and lower ends 125 and 125' and sides 126 and 126 of the edge of the cell case 127 are bonded by thermal welding or with a hot-melt resin such that the electrode assembly is disposed in the cell case 127 in a sealed state.

Insulation films 121 for achieving insulation are partially attached to the upper and lower surfaces of the protruding positive electrode terminal 122 and the protruding negative electrode terminal 124. The sides 126 and 126' of the battery cell 120 are completely covered by a sealing member 129 made of a hot-melt resin such that the battery cell 120 is sealed.

Specifically, upper and lower contact parts, which are each made of a laminate sheet, of the sides 126 and 126' of the battery cell 120 are bonded in a sealed state by thermal welding or with a hot-melt resin, and then the bonded portions are sealed by the sealing member 129. That is, the sides 126 and 126' of the battery cell 120 are configured to have a double sealed structure. In the sealed structure as described above, when gas is generated in the battery cell 120, the gas is prevented from being discharged through the sides 126 and 126' of the battery cell 120, which exhibit high sealability, but is allowed from being discharged in directions in which the electrode terminals 122 and 124, which are not sealed by the sealing member 129, protrude.

However, the double sealed structure shown in FIG. 3 is only illustrative, and therefore it should be understood that a double sealed structure using a sealing member is decided based on a direction in which a coolant flows, which will hereinafter be described in detail with reference to FIGS. 4 and 5.

Figure 4:
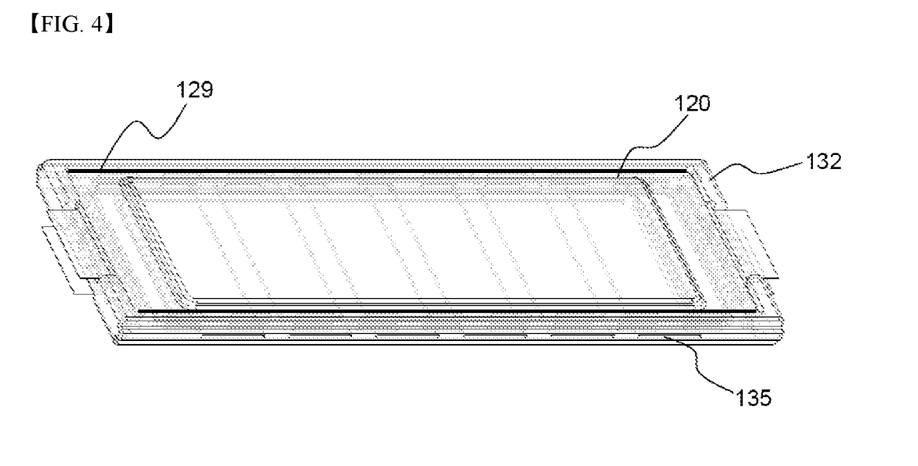
FIG. 4 is a typical view showing a structure in which battery cells, one of which is shown in FIG. 3, are mounted to a cartridge.
Figure 5:
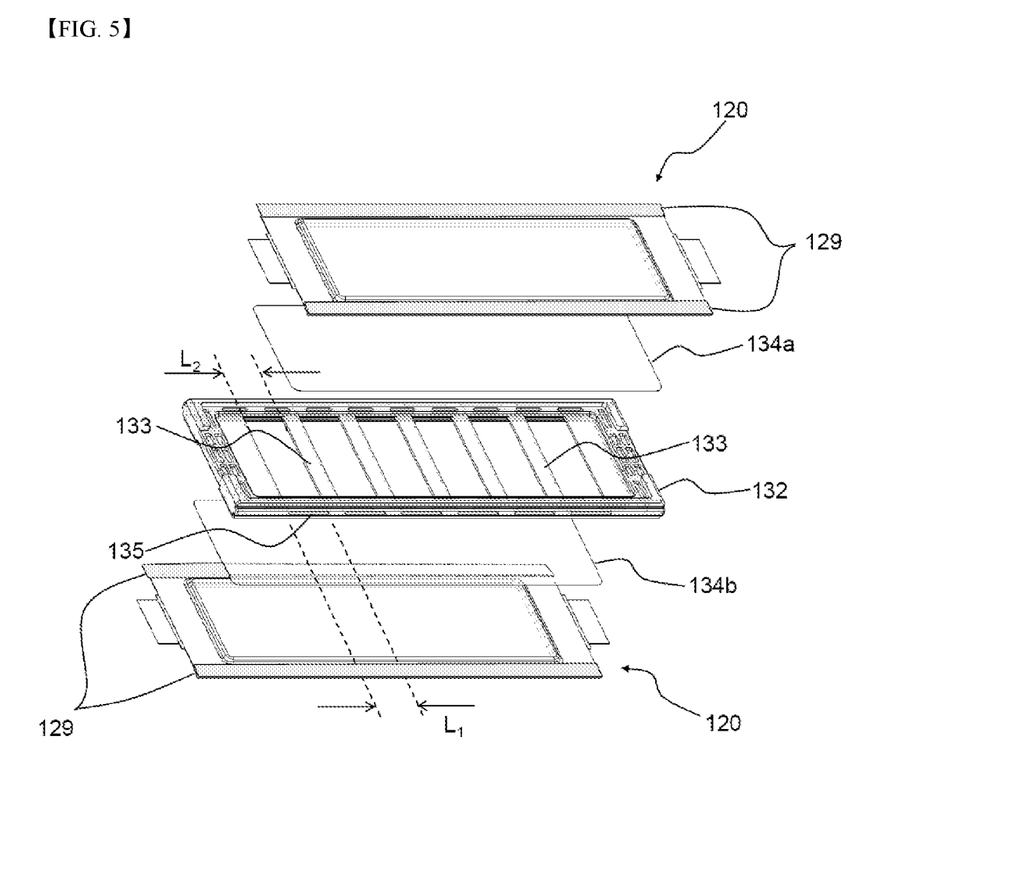
FIG. 5 is an exploded view of FIG. 4.

FIG. 4 is a typical view showing a structure in which battery cells, one of which is shown in FIG. 3, are mounted to a cartridge, and FIG. 5 is an exploded view of FIG. 4.

Referring to FIGS. 4 and 5 together with FIG. 3, the cartridge 130 includes a cooling fin interposed between the battery cells 120 and a cartridge frame 132 for fixing the cooling fin. The cooling fin includes two cooling plates 134a and 134b that are stacked. The cooling plates 134a and 134b are coupled to the cartridge frame 132 in a state of being spaced apart from each other to define coolant flow channels. The cartridge frame 132 is provided at opposite sides thereof with openings 135 communicating with the coolant flow channels defined by the cooling plates 134a and 134b.

A plurality of ribs 133 is formed inside the cartridge frame 132 in a state of being arranged in parallel to each other such that the flow of a coolant can be guided through spaces between the respective ribs 133. The width $L_1$ of each of the openings 135 corresponds to the distance $L_2$ between neighboring ones of the ribs 133, and the openings 135 are located so as to correspond to spaces defined between the ribs 133. Consequently, the openings 135 may function as coolant inlet ports and coolant outlet ports of the coolant flow channels defined between the ribs 133.

The battery cells 120 are mounted to the top and the bottom of the cartridge 130 such that the tops of the battery cells 120 contacts the cooling plates 134a and 134b in a state in which the sides 126 and 126' of each of the battery cells 120 are sealed by the sealing member 129 in order that gas is prevented from being discharged from each of the battery cells 120 in a direction in which the coolant flows, i.e. in a direction in which the openings 135 of the cartridge frame 132 are located.

In the structure in which the battery cells 120 are mounted to the cartridge 130, a coolant, introduced through the openings 135 of the cartridge frame 132, flows along the coolant flow channels defined between the ribs 133 such that the coolant flow channels communicate with the openings 135. At this time, the coolant exchanges heat with the cooling plates 134a and 134b to remove heat from the battery cells 120.

Since gas generated in each of the battery cells 120 is prevented from being discharged through the sides of each of the battery cells 120 due to the sealing member 129, the gas may be discharged in directions in which the electrode terminals 122 and 124 protrude. As a result, the gas may be discharged in a direction perpendicular to a direction in which the coolant is introduced, thereby considerably restraining the introduction of the gas into the coolant flow channel.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

INDUSTRIAL APPLICABILITY

As is apparent from the above description, the battery module according to the present invention is configured to have a structure in which one side or opposite sides of a battery cell is sealed by a sealing member on the interface between the battery cell and a coolant flow channel in order to prevent gas generated in the battery cell from being introduced into the coolant flow channel. Consequently, it is possible to prevent the gas from being discharged through the sides of the battery cell, thereby effectively preventing the gas from being introduced into the coolant flow channel. In addition, the gas is discharged in a direction different from a direction in which a coolant flows. Consequently, it is possible to prevent mixing of the coolant and the gas in the battery module, thereby lengthening the lifespan of the battery module and securing the safety of the battery module.

The invention claimed is:

1. A battery module comprising:
   two or more battery cells, which can be charged and discharged, arranged in a stacked state; and
   cartridges for fixing the battery cells to constitute a battery cell stack,
   wherein each of the cartridges comprises two cooling plates, each cooling plate contacts a battery cell at a first side thereof, and contacts a cartridge frame at a second side, opposite the first side, the cartridge frame fixes the two cooling plates,
   wherein the two cooling plates are mounted to opposite sides of the cartridge frame in a state of being spaced apart from each other, with the cartridge frame located between the two cooling plates, in order to define a coolant flow channel,
   wherein the cartridge frame comprises a first lateral side and a second lateral side opposite to the first lateral side and openings at said first lateral side and said second lateral side communicating with the coolant flow channel, and
   wherein one side or opposite sides of each of the battery cells are sealed by a sealing member on an interface between each of the battery cells and the coolant flow channel in order to prevent gases generated in the battery cells from being introduced into the coolant flow channel,
   wherein an interior of the cartridge frame is provided a plurality of ribs extending from the first lateral side to the second lateral side.

2. The battery module according to claim 1, wherein the sealing member seals the opposite sides of each of the battery cells excluding regions of each of the battery cells from which electrode terminals protrude.

3. The battery module according to claim 2, wherein the sealing member seals the opposite sides of each of the battery cells in a state of surrounding the opposite sides of each of the battery cells.

4. The battery module according to claim 1, wherein the sealing member is made of a thermoplastic resin.

5. The battery module according to claim 4, wherein the thermoplastic resin is a hot-melt resin.

6. The battery module according to claim 1, wherein sealing is achieved by potting.

7. The battery module according to claim 1, wherein each of the battery cells is a rectangular plate-shaped battery cell.

8. The battery module according to claim 7, wherein the plate-shaped battery cell is a pouch-shaped battery cell configured to have a structure in which an electrode assembly is mounted in a cell case made of a laminate sheet comprising a resin layer and a metal layer, an edge of the cell case is sealed by thermal bonding.

9. The battery module according to claim 7, wherein the plate-shaped battery cell is a pouch-shaped battery cell configured to have a structure in which an electrode assembly is mounted in a cell case made of a laminate sheet comprising a resin layer and a metal layer, an edge of the cell case is bonded with a hot-melt resin.

10. The battery module according to claim 1, wherein the ribs are arranged in parallel to each other in a direction in which the coolant flow channel is defined.

11. The battery module according to claim 1, wherein each of the openings has a width corresponding to a distance between the ribs.

12. The battery module according to claim 1, wherein the cooling plates are configured such that surfaces of the cooling plates contacting the battery cells are formed in a flat shape.

13. The battery module according to claim 1, wherein the cooling plates are configured such that opposite ends of the cooling plates corresponding to one side of the cartridge frame in which the openings are formed and the other side of the cartridge frame in which the openings are formed are integrally mounted to the cartridge frame.

14. The battery module according to claim 1, wherein the battery cell stack is configured to have a structure in which two battery cells are mounted between one cartridge and an adjacent cartridge.

15. The battery module according to claim 1, wherein each of the battery cells is configured to have a structure in which a positive electrode terminal and a negative electrode terminal protrude from one side of an edge of each of the battery cells or a structure in which the positive electrode terminal protrudes from one side of the edge of each of the battery cells and the negative electrode terminal protrudes from the other side of the edge of each of the battery cells.

16. The battery module according to claim 1, further comprising:
    an upper end plate and a lower end plate for respectively supporting an upper end and a lower end of the battery cell stack in which the battery cells are stacked in a vertical direction in a state of being fixed by the cartridges; and
    a front plate and a rear plate mounted to the battery cell stack such that the front plate and the rear plate respectively surround one side and the opposite side of each of the battery cells from which electrode terminals of each of the battery cells protrude.

17. The battery module according to claim 16, wherein at least one of the upper and lower end plates is provided with two or more beads.

18. The battery module according to claim 16, wherein at least one of the upper and lower end plates is provided at opposite ends of the edge thereof with extensions, which are perpendicularly bent to cover corner parts of one side and the opposite side of each of the battery cells from which the electrode terminals of each of the battery cells protrude.

19. The battery module according to claim 18, wherein the perpendicularly bent extensions are coupled to the front plate or the rear plate.

20. The battery module according to claim 1, wherein each of the battery cells is a lithium secondary battery.

21. A battery pack comprising a battery module according to claim 1 as a unit module.

22. A device comprising a battery pack according to claim 21.

23. The device according to claim 22, wherein the device is an electric vehicle, a hybrid electric vehicle, a plug-in hybrid electric vehicle, or a power storage apparatus.

* * * * *